Dec. 5, 1961  D. BROWN  3,011,955
PURIFICATION OF PHTHALIC ANHYDRIDE
Filed June 4, 1959
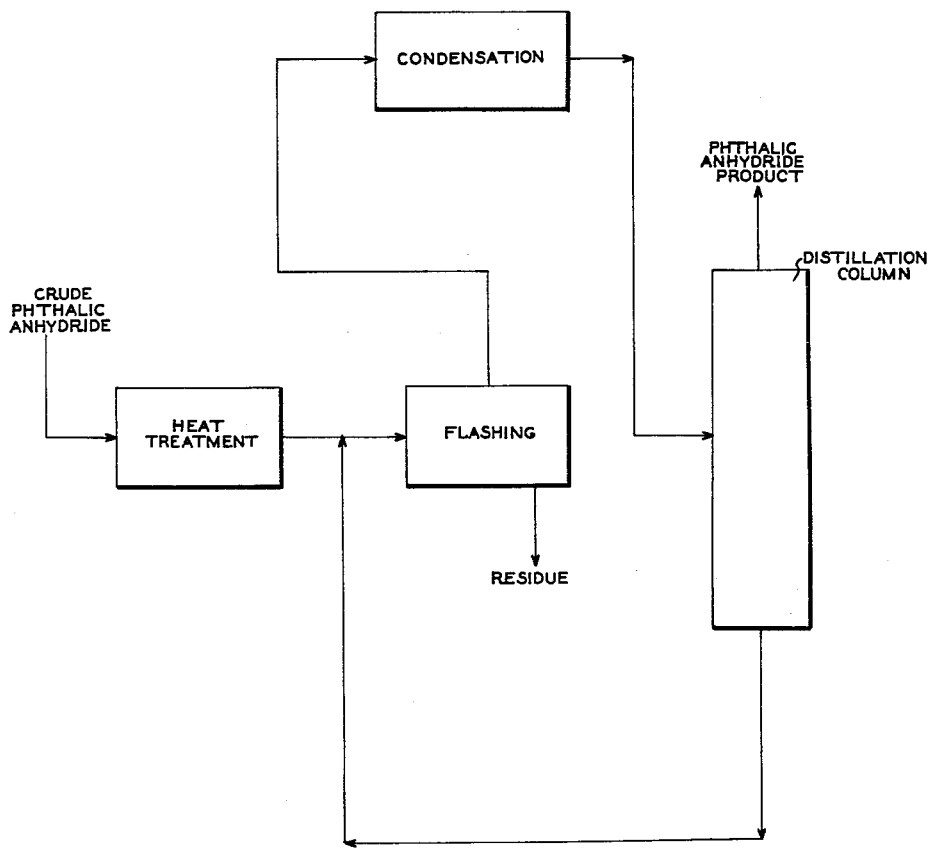

United States Patent Office 3,011,955
Patented Dec. 5, 1961

3,011,955
PURIFICATION OF PHTHALIC ANHYDRIDE
David Brown, New York, N.Y., assignor to Scientific Design Company, Inc., a corporation of Delaware
Filed June 4, 1959, Ser. No. 817,999
7 Claims. (Cl. 202—53)

This invention relates to the purification of phthalic anhydride and more particularly relates to an improved process for the removal of color forming bodies from phthalic anhydride.

Presently used commercial methods of purifying crude phthalic anhydride involve the heat treatment of the crude phthalic anhydride, at or near its boiling point, in the presence or absence of chemical additives, followed by fractional distillation of the melt to recover a purified phthalic anhydride. The chief disadvantage of this method is that the distillation of phthalic anhydride occurs in the presence of appreciable quantities of polymers and other impurities which remain in the melt after the heat and chemical treatment. These impurities tend to decompose at the high temperatures and long residence times encountered during the fractional distillation, forming lighter impurities which are carried along with the phthalic anhydride, reducing its purity and leading to color formation.

In order to provide a phthalic anhydride product of satisfactory purity and color, it is necessary that these difficulties be substantially reduced or eliminated.

It is therefore an important object of the present invention to provide an improved method of purifying a crude phthalic anhydride melt comprising the combination of heating said melt to remove a portion of the contained impurities, flashing the phthalic anhydride before deleterious decomposition of the remaining liquid residue occurs, disengaging said flashed phthalic anhydride from the remaining liquid residue, fractionally distilling the flashed phthalic anhydride, and recovering said phthalic anhydride in pure form.

Other objects, features and advantages of the present invention will be apparent to those skilled in the art from the following detailed description of a preferred embodiment thereof.

The present invention is based on the discovery that an intermediate rapid flash step in the processing of crude phthalic anhydride, in combination with the heat treatment and fractional distillation steps, greatly improves the purification of the phthalic anhydride.

The present invention contemplates heat treating a crude phthalic anhydride melt, rapidly flashing the melt to remove heavy residues, and fractionally distilling the flashed melt to obtain a high quality phthalic anhydride product without encountering the difficulties inherent in present day practices.

The drawing shows a schematic layout of apparatus assembled to perform the method of this invention.

The attainment of a high quality phthalic anhydride product having a relatively low color forming impurity content is accomplished in the present invention by heat treating a phthalic anhydride melt to remove the bulk of the impurities, flashing the phthalic anhydride in the heat treated melt before deleterious decomposition of the remaining liquid residue occurs, disengaging the flashed phthalic anhydride from the remaining liquid residue, fractionally distilling the flashed phthalic anhydride and recovering the phthalic anhydride. The apparatus in which flashing occurs may comprise an elongated flash still having thermal walls for effecting rapid flashing of the melt, or a suitable low pressure chamber or any other suitable apparatus to effectuate the flash conditions of the invention. In passing through the flash still, the phthalic anhydride melt quickly flashes into the vapor phase, leaving a liquid residue of higher boiling polymers and other impurities. The flashing operation should be conducted in as short a time as possible to avoid decomposition of the unflashed polymers into lighter color producing ends which can be carried along with the flashed phthalic anhydride. To this end the residence time in the flash still should be carefully regulated, depending upon the temperature conditions at which flashing occurs.

In order to effect a suitable flashing of the phthalic anhydride melt in accordance with the method of the invention, the still temperature should be in the broad range between about 134° C. and 310° C. at pressures varying respectively between about 10 mm. and 2 atmospheres. A preferred temperature is about 200° C. to 300° C. at 100 mm. to 5 p.s.i.g.

Under the above conditions the residence time in the still can vary from about as short as .001 second to a maximum of about 10 seconds, the longer residence time corresponding to the lower flash temperature and the shorter residence times being applicable to flashovers conducted at higher temperatures.

In the practice of the invention, it is desirable that the heated walls of the flashing still be constantly wiped or freed from the accumulation of residual material. The retention of residual material upon the heated walls tends to overheat and decompose the adherent residual material into lighter impurities which become incorporated in the phthalic anhydride. In addition, the removal of liquid film from the heated walls of the flash still improves the heat transfer coefficient and reduces the residence time. For this purpose, the still may be equipped with suitable scraper or wiper blades which serve to keep the residual material mobile and facilitate discharge of the residues from the flash still.

In order to indicate still more fully the nature of the present invention, the following examples of typical procedures are set forth, it being understood that these examples are presented as illustrative only and that it is not intended to limit the scope of the invention.

*Example 1*

A crude phthalic anhydride melt is heat treated at 280° C. and atmospheric pressure for 18 hours. The heated melt is then flashed at 284.5° C. and 760 mm. pressure for a residence time of 0.1 second inside of an externally heated tube, the inside surface of which is wiped with a carbon blade. The flashed material is condensed at a temperature of 150° C. and atmospheric pressure and transferred to a batch still. The first 10% of the material in the batch still is distilled and the distillate is returned as reflux at a 10 to 1 reflux ratio. The remainder is distilled at a 1 to 1 reflux ratio. The total residue from the batch still is 2% of the total crude melt containing about 8 to 10% phthalic anhydride. The residue from the batch still is transferred back to the flash tube so that 2% is the total residue from the system.

Not using the intermediate flash step of the invention, the total residue from the batch still is 5% of the total crude containing 45% phthalic anhydride and having a Hazen color of 50 APHA.

*Example 2*

Example 1 is repeated with the heat-treated melt flashed at 228° C. and 200 mm. Hg pressure. Substantially similar results are obtained.

From the above results it will be seen that the method of the invention is substantially more effective in the purification of phthalic anhydride than the conventional method of directly following the heat treatment of crude phthalic anhydride melt with fraction distillation; and that the combination of selectively flashing the phthalic anhydride melt, following the heat treatment but prior to the fractional distillation thereof, results in a high quality product substantially free of color forming impurities.

It will be understood that modifications and variations may be effected without departing from the spirit and scope of the invention.

What is claimed is:

1. In combination with the heating and fractional distillation of a phthalic anhydride containing melt, the improvement comprising rapidly flashing the melt to substantially disengage phthalic anhydride from impurities in the melt, said flashing being conducted following the said heating of said melt and prior to the fractional distillation thereof.

2. In the purification of a phthalic anhydride melt containing polymers and color forming impurities, the combination of steps comprising heat treating the melt, flashing the heat-treated melt for a sufficiently short period of time to flash the phthalic anhydride before deleterious decomposition of the remaining liquid residue occurs, disengaging said flashed phthalic anhydride from the remaining liquid residue, fractionally distilling the flashed phthalic anhydride, and recovering said phthalic anhydride.

3. The process according to claim 2, in which the residue time for flashing is between about .001 second and 10.0 seconds.

4. The process according to claim 2, in which the flashing conditions occur at a temperature between about 10 mm. Hg and 2 atmospheres.

5. The process according to claim 2, in which the flashing conditions occur at a temperature between about 200° C.–300° C. at a pressure between about 100 mm. Hg and 5 p.s.i.g.

6. The process according to claim 2, in which flashing occurs in a flash still having thermal walls for effecting flashing of said melt.

7. The process according to claim 2, in which flashing occurs in a flash still having thermal walls for effecting flashing of said melt, and liquid residue is wiped from said thermal walls.

References Cited in the file of this patent

UNITED STATES PATENTS

| | | |
|---|---|---|
| 2,511,861 | Marotta | June 20, 1950 |
| 2,609,337 | Taylor et al. | Sept. 2, 1952 |
| 2,662,901 | Bailey | Dec. 15, 1953 |
| 2,895,886 | Schneider | July 21, 1959 |